June 7, 1966   A. J. GORDON   3,254,400
METHOD AND APPARATUS FOR FORMING EXTRUSIONS
Filed June 30, 1964   2 Sheets-Sheet 1
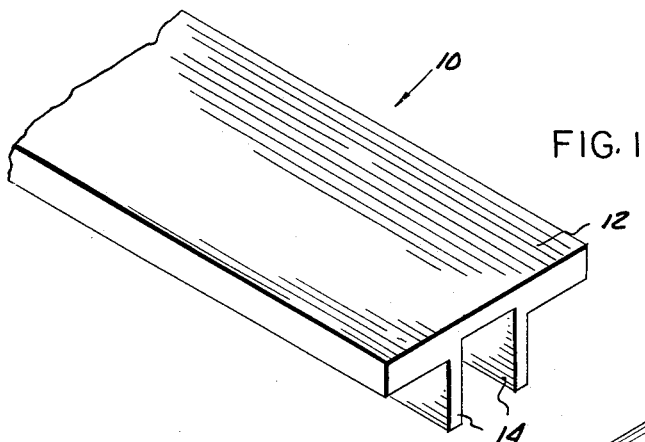
FIG. 1
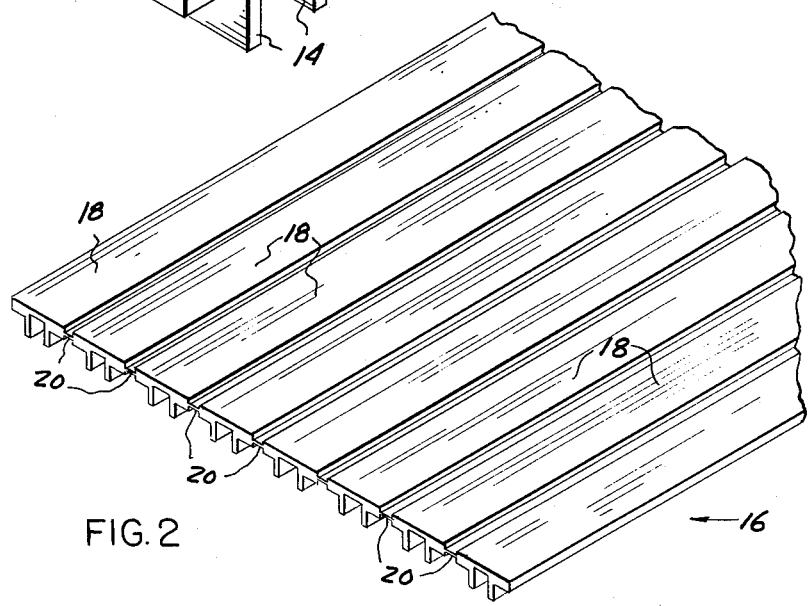
FIG. 2
FIG. 3
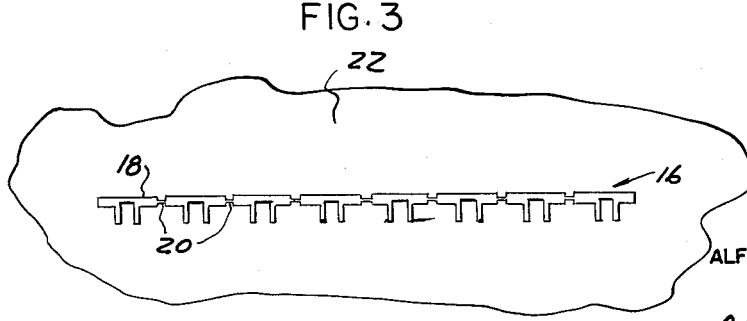
INVENTOR.
ALFRED JACK GORDON
BY
ATTORNEY

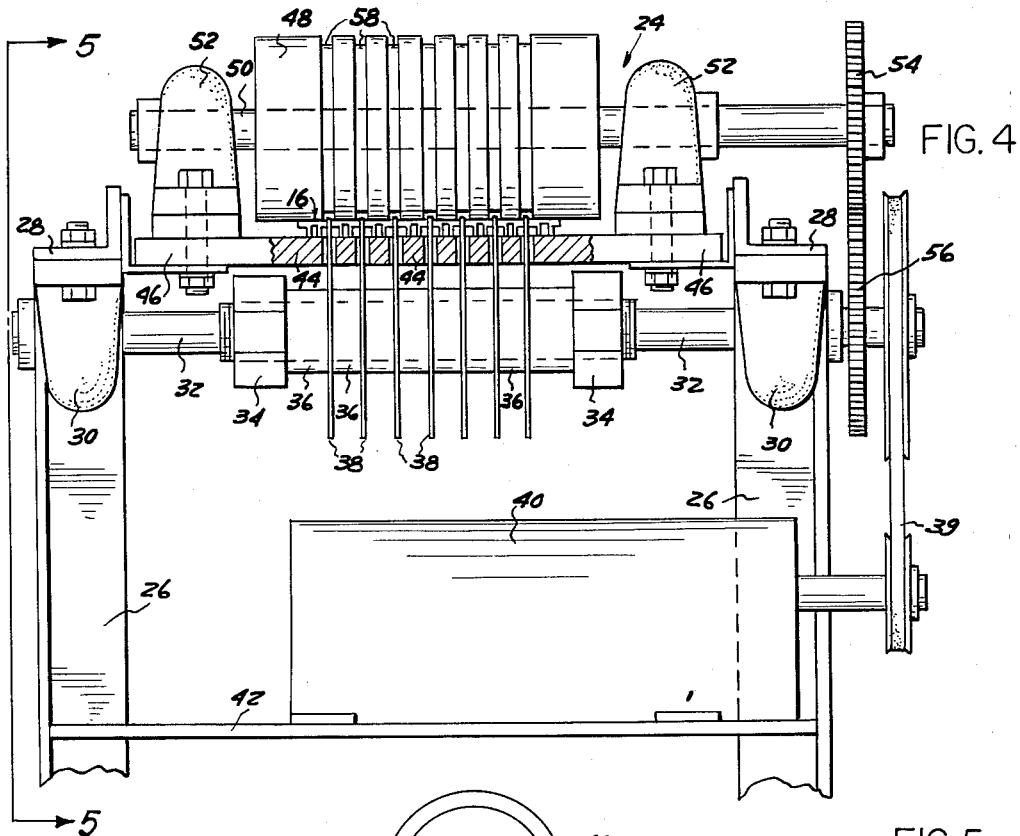
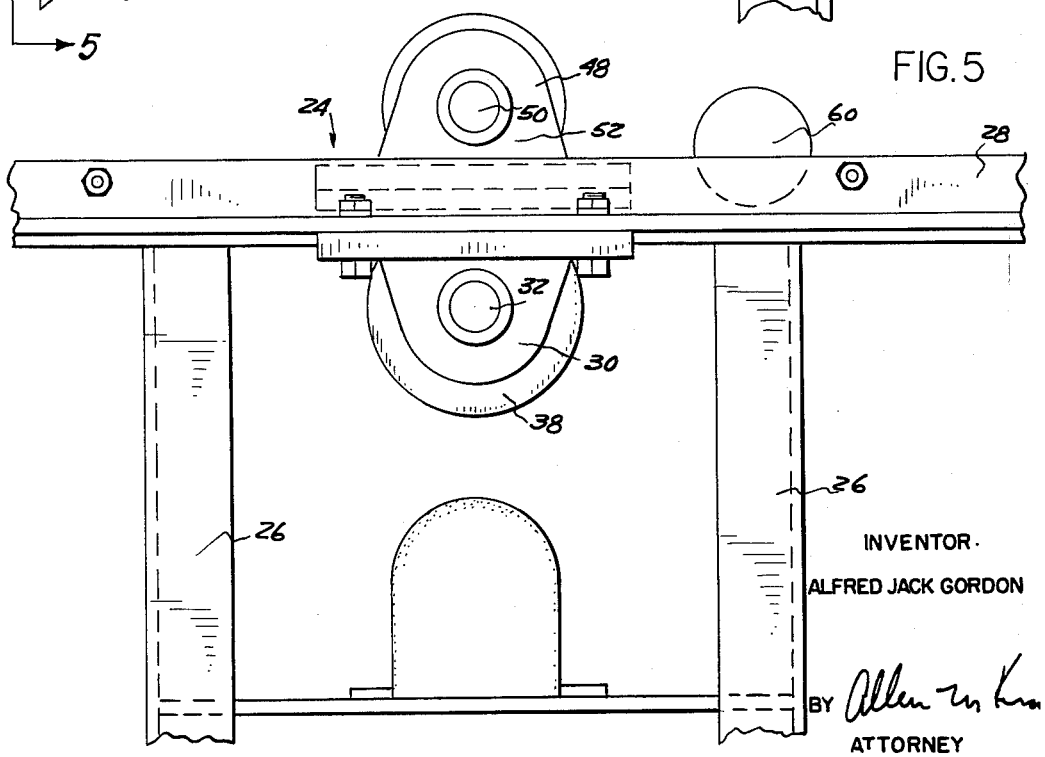

# United States Patent Office 3,254,400
Patented June 7, 1966

3,254,400
METHOD AND APPARATUS FOR FORMING EXTRUSIONS
Alfred J. Gordon, Adrian, Mich., assignor to Alfred J. Gordon, Adrian, Mich., and Alexander J. Gordon, Farmington, Mich., joint tenants
Filed June 30, 1964, Ser. No. 379,247
9 Claims. (Cl. 29—413)

This invention relates to a method of forming, stretching, and separating extrusions of a relatively small cross-section and to apparatus useful in the practice of such method, and has particular reference to the extrusion of aluminum.

The cost of an aluminum extrusion is a function of the weight of the aluminum contained in the extrusion, the cost of the labor employed in forming the extrusion and the overhead and machine charges applicable to the labor. Since an extrusion of a relatively large cross-section may be formed with the same labor required to produce a relatively small cross-section extrusion, the total cost per pound of extruded aluminum sections is inversely proportional to the cross-section area contained in the section, i.e., an extrusion having a very small cross-section costs much more per pound than an extrusion having a large cross-section.

The present invention has as its object to provide a method of forming aluminum extrusions and apparatus for practicing the method, whereby the amount of labor required to produce an extrusion of a small cross-section is greatly reduced so as to bring the cost per pound of a small cross-section extrusion into close relation with that of a much larger cross-section.

In essence the present invention consists of forming small cross-section extrusions by employing a die which extrudes a configuration comprising a number of the small cross-section extrusions joined to one another by thin, short, connecting webs. The multiple extruded section is then processed just as the single section would be, undergoing any necessary stretching, straightening, or other operations and is in general treated as a single unit. Immediately prior to the utilization of the extrusions in a structure, or the packaging of the extrusions if they are formed at one plant and sent to another, the multiple extrusion is passed through a separating machine formed in accordance with the present invention which separates the units at their connecting webs to form the plurality of small cross-section extrusions which are the desired end product of the operation. With the exception of the separating operation, which is simple and low in cost, the method of the present invention produces a number of small cross-section extrusions with the same labor cost and machine time charge as would be required to produce an extrusion having a cross-section equal to that of the multiple extrusion unit. In this manner small cross-section extrusions may be produced at a cost per pound similar to that of larger extrusions.

In the preferred embodiment of the invention, the multiple extrusion is formed to have a cross-section equal to that of a plurality of the smaller cross-sections, joined by webs lying in the same plane. While it is possible, and within the scope of the present invention to produce a multiple extrusion wherein the connecting webs do not lie in the same plane, the present invention has as one of its objects to provide a slitting machine which is especially useful in connection with multiple extrusions wherein the webs do lie in the same plane.

I have determined that if the connecting web is formed with a thickness within critical limits the multiple extrusion is rigid enough to be handled as a single extrusion and yet the webs may be easily removed by an appropriate machine without appreciable waste. Experimentation has proven that the web must be no greater than .020 inch in thickness or less than .005 inch in thickness. Multiple extrusions formed with connecting webs lying within these limits exhibit the properties required to be useful in connection with the present invention.

It is therefore seen to be a primary object of the present invention to provide a method of forming small cross-section aluminum extrusions wherein a multiple extrusion is first formed having a cross-section similar to a plurality of the small cross-section units joined by thin connecting webs, which multiple extrusion is processed in the manner of a single extrusion having the larger cross-section, and the multiple unit is then separated by removing connecting webs to form a plurality of extrusions of a smaller cross-section.

The connecting web must be removed in the slitting operation without leaving any residue such as a ridge which would deform the adjacent walls of the smaller extrusions. Additionally, the web material is scraped and it is essential that the web length be maintained as short as possible. In practice, I have found that a web length no greater than .10 inch and no less than .010 inch is sufficient to maintain the sections of the multiple extrusion in rigid relation to one another for the purposes of the intermediate processing operations and yet does not provide an excess of scrap.

The machine used in connection with the present invention to separate a multiple extrusion into a plurality of extrusions of smaller cross-section, operates to press the connecting webs away from the smaller extrusions at their points of contact with the extrusions so as to leave a smooth extrusion surface with no appreciable edge. The separator takes the form of a plurality of discs disposed on a central axis at separations equal to the separations between the connecting webs of the multiple extrusion. These discs do not have sharp cutting edges but rather have an edge thickness which very closely approximates the length of the cutting web and is slightly undersize with respect to such length. That is, a disc may have a thickness approximately .001 inch less than the connecting web. A multiple extrusion is adapted to be forced between the discs and a separator roll which has a plurality of slots slightly larger than the length of the connecting web. The multiple extrusion is forced between the roll and the disc so that the discs are forced against the connecting webs and press them out of connection with the individual cross-sections. The roll with the slots bears against the multiple extrusion and the slots provide room for the scrap web to pass. The use of this pressing technique which forces the thin flange off of the multiple extrusion provides important advantages with respect to a normal slitter among them being the elimination of any burr at the connection between the web and the individual extrusion.

A further object of the present invention is in the practice of the above method to provide a multiple extrusion having connecting webs with a thickness between .020 and .005 inch and a length between .100 and .010 inch.

Another object of the invention is to provide a machine for separating a multiple extrusion into a plurality of smaller cross-section extrusions which operate by removing the connecting webs at their points of joinder with each of the smaller cross-sections.

Other objects, advantages, and applications of the present invention will be made apparent by the following detailed description of the preferred embodiment of the invention. The description makes reference to the accompanying drawings in which:

FIGURE 1 is a perspective view of an aluminum extrusion having a relatively small cross-section which is the end product of the process and apparatus of the present invention;

FIGURE 2 is a perspective view of a section of multiple extrusion which is intermediate product of the process of the present invention;

FIGURE 3 is an end view of an extrusion die operative to form the multiple extrusion section of FIGURE 2;

FIGURE 4 is a side view of a machine operative to separate the multiple extrusion of FIGURE 2 into a plurality of the smaller extrusions of FIGURE 1 by removing their connecting webs; and FIGURE 5 is a sectional view of the machine taken along lines 5—5 of FIGURE 4.

Referring to the drawings, the primary purpose of the present invention is to provide a method of forming aluminum extrusions of a small cross-section such as the length of extrusion generally indicated at 10. The dimensions of an average extrusion, such as 10, which is to be formed by the present invention, is of importance to the purpose of the invention. For example, the workpiece 10 may have a flange 12 which is approximately ½ inch in width and ⅝ inch in thickness and a pair of parallel extending flanges 14 approximately ⅛ inch in height. Such an extrusion might have a weight of approximately ⅓ of a pound per linear foot.

The technique of the prior art is to produce such sections by extruding them and then performing necessary finishing operation such as cutoff and stretching. Since the extruding machine which produces such sections is capable of producing a much heavier section, such as one weighing five or six pounds per foot, and the labor and machinery involved in producing the light section is the same as that required to produce the heavy section, the costs of equivalent lengths of the two extrusions differ only be the difference in cost of the material involved in the two cases. The lighter extrusion is much more expensive on a per pound basis.

Extrusions such as 10 are produced by the present invention by first forming a multiple extrusion generally indicated at 16. Such extrusion has a cross-section formed by a plurality of units 18 which are of the same shape as the single extrusion 10, with the ends of the flanges 12 of adjacent sections joined by thin connecting webs 20.

The webs 20 must have a sufficient thickness to allow them to be extruded by a normal machine at a reasonable rate and pressure and to maintain the connection between the sections 18 through a plurality of finishing operations such as cutoff and stretching. The maximum thickness of the connecting webs 20 is limited by the increased difficulty of subsequent removal of the web as a thicker web is employed and the fact that the webs 20 represent scrap material to the process. I have determined that the present process exhibits the maximum efficiency when the web thickness is between .020 inch and .005 inch.

The length of the connecting webs 20 is similarly limited by strength and waste considerations. I have found that a web length between .100 inch and .101 inch provides a maximum efficiency when used in accordance with the present invention.

It should be noted that the webs 20 of a multiple extrusion 16 all lie in the same plane. While the broad concept of the present invention may be practiced with multiple extrusions wherein the connecting webs lie in different planes, the common-plane configuration is best suited to use with the web-separating apparatus of FIGURES 4 and 5.

Following the formation of a multiple-extrusion section 16 by a die 22 such as is partly shown in FIGURE 3 and may be or normal form, the multiple extrusion is subjected to a cutoff operation, stretching operation and such other finishing operations as need normally be performed thereon. These operations are performed as if the multiple extrusion 16 were the end product of the operation.

Following the performance of these intermediate operations, the multiple extrusion 16 is passed through a separator of the type shown in FIGURES 4 and 5. The separator, generally indicated at 24, has the function of removing the connecting webs 20 so as to form the sections 18 into a plurality of separate units of the type 10.

The separator 24 is supported on four vertical leg members 26 which may be formed of angle iron. Another pair of horizontal angle irons 28 run between opposed pairs of legs 26 on opposite sides. Centrally between legs 26, the horizontal members 28 support a pair of bearing blocks 30, one block being supported on the underside of each of the horizontal members 28. The bearing blocks 30 have their bearings aligned with one another and support a shaft 32 which extends between the blocks 30 and is rotatably journaled therein. A central portion of the shaft 32 is threaded and carries a pair of nuts 34 which between them retain a plurality of spacer blocks 36 which are separated by a plurality of discs 38. The discs 38 have blunt peripheries having a thickness approximately .001–.003 inch less than the length of the webs 20 which connect the extrusion sections 18. The sides of the discs 38 are maintained absolutely normal with respect to the periphery and the intersections thereof are sharpened.

The spacing between the discs 38 is the same as that between the webs 20 of the multiple extrusion section 16. The shaft 32 is powered by a belt drive 39 from a power unit 40 which includes both a motor and a gear-reducer drive. The power drive is supported on a shelf 42 which extends between the angle iron legs 26.

A cutting table 44 is supported above the discs 38 between a pair of angle irons 46 which are attached to the horizontal members 28. The table 44 has a plurality of apertures 45 which allow the upper ends of the disc 38 to extend through and above the table. The discs 38 extend through the apertures 45 and beyond a distance greater than the thickness of a multiple section extrusion 16 which is to be passed through the separator.

An upper complementary roll 48 is supported above the table 44 on a shaft 50. The shaft is supported on a pair of bearing blocks 52 disposed on opposite ends of the cutting table 46. The shaft 50 is driven by a gear 54 which is in mesh with a gear 56 carried on the shaft 32. Thus, the roll 48 is rotated in timed relation to the rotation of the discs 38. The roll 48 has a plurality of slots 58 formed on its surface in complementary relation to the discs 38. The roll 48 is preferably formed of a relatively soft rubber-like material and is adapted to bear against the sections of the multiple extrusion 16 between the webs. The slots 58 are considerably wider than the discs 38 and are operative to allow clearance for the discs to pass through and press out the webs 20 of the extrusion 16.

A roll 60 is also supported on the upper side of a cutting table 44 and bears against a multiple extrusion passed over the table. The roll 60 is preferably formed of the same material as is the roll 48. The roll 60 may be driven by suitable power transmission devices connected to the drive 40.

In operation, a multiple extrusion section 16 to be separated is manually inserted on the table 44 so that the discs 38 fall into the slots formed adjacent to the webs 20. The edges of the discs 38 are operative to shear the webs off at their lines of contact with the extrusion sections 18. The shearing is a clean action which completely removes the web and presses it up to the space formed by the slots 58 and the roll 48. The position of the roll 48 with respect to the position of the table 44 is such that the multiple extrusion section 16 is pressed between the two and thus moved forward through the discs. The spacing of the roll 60 with respect to the table is similar and acts to remove the separated extrusion sections 16 from the cutting table 44.

Other shapes of roll 48 and table 44 may be required for different extrusion section shapes.

It is thus seen that the present invention allows a plurality small cross-section extrusions to be formed at a labor cost closely approximating that required for a heavier extrusion section.

Having thus described my invention, I claim:

1. The process of forming extrusions of a first, relatively small, cross-section, comprising:

extruding aluminum through an extruding die which has a cross-section formed of a plurality of said first relatively small cross-sections joined by connecting web having a width between .100 inch and .010 inch and a thickness between .020 inch and .005 inch, all of said webs lying in a common plane to form a single multiple extrusion;

intermediately processing said multiple extrusion by operations including cutoff stretching and straightening;

and passing said multiple extrusion through a separating machine having a number of cutting discs disposed on a single central shaft, each disc having an edge dimension slightly less than the lengths of said connecting webs, and a roll having a number of slots therein positioned in complementary relationship to the discs, said roll being disposed about an axis parallel to and separated from the central axis of said shaft, the width of each of said slots being greater than the width of each of said discs, said discs and said roll being rotated in timed relation to one another, said multiple extrusion being passed between said roll and said discs so that the discs bear against and shear off the connecting webs so as to form a plurality of extrusions of said first cross-section.

2. The process of forming extrusions of a first, relatively small, cross-section, comprising:

extruding aluminum through an extruding die which has a cross-section formed of a plurality of said first relatively small cross-sections joined by connecting webs having a width between .100 inch and .010 inch and thickness between .020 inch and .005 inch, all of said webs lying in a common plane to form a single multiple extrusion;

intermediately processing said multiple extrusion by operations including cutoff stretching and straightening;

and passing said multiple extrusion through a separating machine having a number of cutting discs disposed on a single central shaft, each disc having an edge dimension slightly less than the length of said connecting webs, and a roll having a number of slots therein positioned in complementary relationship to the discs, said roll being disposed about an axis parallel to and separated from the central axis of said shaft, the width of each of said slots being greater than the width of each of said discs, said multiple extrusion being passed between said roll and said discs so that the discs bear against and shear off the connecting webs so as to form a plurality of extrusions of said first cross-section.

3. The process of forming extrusions of a first, relatively small, cross-section, comprising:

extruding aluminum through an extruding die which has a cross-section formed of a plurality of said first relatively small cross-sections joined by connecting webs, all of said webs lying in a common plane to form a single multiple extrusion;

intermediately processing said multiple extrusion by operations including cutoff stretching and straightening;

and passing said multiple extrusion through a separating machine having a number of cutting discs disposed on a single central shaft, each disc having an edge dimension slightly less than the length of said connecting webs, and a roll having a number of slots therein positioned in complementary relationship to the discs, said roll being disposed about an axis parallel to and separated from the central axis of said shaft, the width of each of said slots being greater than the width of each of said discs, said discs and said roll being rotated in timed relation to one another, said multiple extrusion being passed between said roll and said discs so that the discs bear against and shear off the connecting webs so as to form a plurality of extrusions of said first cross-section.

4. The process of forming extrusions of a first, relatively small, cross-section, comprising:

extruding aluminum through an extruding die which has a cross-section formed of a plurality of said first relatively small cross-sections joined by connecting webs having a width between .100 inch and .010 inch and thickness between .020 inch and .005 inch;

intermediately processing said multiple extrusion by operations including cutoff stretching and straightening;

and passing said multiple extrusion through a separating machine having a number of cutting discs disposed on a single central shaft, each disc having an edge dimension slightly less than the length of said connecting webs, and a roll having a number of slots therein positioned in complementary relationship to to the discs, said roll being disposed about an axis parallel to and separated from the central axis of said shaft, the width of each of said slots being greater than the width of each of said discs, said discs and said roll being rotated in timed relation to one another, said multiple extrusion being passed between said roll and said discs so that the discs bear against and shear off the connecting webs so as to form a plurality of extrusions of said first cross-section.

5. The method of forming extrusions having a first relatively small, cross-section, comprising:

forming a multiple extrusion having a second, larger cross-section which consists of a plurality of units of the first, smaller cross-section, joined to one another by thin, short connecting webs all lying in a common plane; performing intermediate operations on said multiple extrusions, including cutoff and stretching;

and removing said connecting webs so as to form a plurality of extrusions of the first, smaller cross-section.

6. The method of forming extrusions having a first, relatively small, cross-section, comprising:

forming a multiple extrusion having a second, larger, cross-section which consists of a plurality of units of the first, smaller, cross-section, joined to one another by connecting webs having a thickness between .020 inch and .005 inch;

performing intermediate operations on said multiple extrusions, including cutoff and stretching;

and removing said connecting webs so as to form a plurality of extrusions of the first, smaller cross-section.

7. The method of forming extrusions having a first, relatively small, cross-section, comprising:

forming a multiple extrusion having a second, larger, cross-section which consists of a plurality of units of the first, smaller cross section, joined to one another by thin, short connecting webs;

performing intermediate operations on said multiple extrusions, including cutoff and stretching; and removing said connecting webs so as to form a plurality of extrusions of the first, smaller, cross-section.

8. The method of forming extrusions having a first, relatively small, cross-section, comprising:

forming a multiple extrusion having a second, larger cross-section which consists of a plurality of units of the first, smaller cross-sections, joined to one another by thin, short connecting webs;

performing intermediate operations on said multiple extrusions; and removing said connecting webs so as to form a plurality of extrusions of the first, smaller cross-section.

9. A machine for use in separating a multiple extrusion formed of a plurality of similar cross-sections joined by thin connecting webs having a length lying between .100 and .010 inch, comprising:

a first central axis having a plurality of discs thereon each disc having a periphery formed perpendicularly to the sides of the rolls and parallel to the central axes and having a thickness slightly less than the thickness of said connecting webs, said discs being separated by distances equal to the distances between said connecting webs;

a roll having a plurality of slots formed therein at distances equal to the distances between said connecting webs, the slots in said roll having a width greater than the length of said connecting webs, said slots being disposed in complementary positions to said discs, said roll being disposed parallel to said central axis and separated therefrom a sufficient distance so that discs enter said slots;

and means for rotating said central axis of said disc and said roll in timed relation to one another whereby a multiple extrusion passed between said discs and said roll has its connecting webs pressed out by said discs.

References Cited by the Examiner
UNITED STATES PATENTS

| | | | |
|---|---|---|---|
| 2,008,626 | 7/1935 | Murakami | 29—529 |
| 2,113,074 | 4/1938 | Bate | 29—413 X |
| 2,134,749 | 11/1938 | Burt | 29—413 |

JOHN F. CAMPBELL, *Primary Examiner.*

THOMAS H. EAGER, *Examiner.*